United States Patent
Levi et al.

(10) Patent No.: US 10,354,280 B2
(45) Date of Patent: *Jul. 16, 2019

(54) SYSTEM AND METHOD FOR DISTRIBUTION OF TARGETED ADVERTISING BETWEEN MOBILE COMMUNICATION DEVICES

(71) Applicant: Blue Calypso, LLC, Dallas, TX (US)

(72) Inventors: Andrew E. Levi, Plano, TX (US); Bradley W. Bauer, Richardson, TX (US)

(73) Assignee: BLUE CALYPSO, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/291,977

(22) Filed: May 30, 2014

(65) Prior Publication Data
US 2014/0279017 A1    Sep. 18, 2014

Related U.S. Application Data

(63) Continuation-in-part of application No. 13/908,825, filed on Jun. 3, 2013, which is a continuation of
(Continued)

(51) Int. Cl.
*G06Q 30/02* (2012.01)
*H04M 15/00* (2006.01)
(Continued)

(52) U.S. Cl.
CPC ..... *G06Q 30/0267* (2013.01); *G06Q 30/0207* (2013.01); *G06Q 30/0217* (2013.01);
(Continued)

(58) Field of Classification Search
CPC combination set(s) only.
See application file for complete search history.

(56) References Cited

U.S. PATENT DOCUMENTS

| 4,850,007 A | 7/1989 | Marino et al. |
| 5,333,186 A | 7/1994 | Gupta |

(Continued)

FOREIGN PATENT DOCUMENTS

| GB | 2504952 | 2/2014 |
| JP | 2001256388 | 9/2001 |

(Continued)

OTHER PUBLICATIONS

*Groupon, Inc.* v. *Blue Calypso, LLC*; PTAB Case No. CBM2013-00033; Final Written Decision; Paper 51; Dec. 17, 2014.
(Continued)

*Primary Examiner* — Saba Dagnew
(74) *Attorney, Agent, or Firm* — Schultz & Associates, P.C.

(57) ABSTRACT

Disclosed are a method and system for distribution of targeted advertising between mobile communication devices. An endorsement program is set up based on a profile of an advertiser having at least one advertising media. A qualified subscriber is identified for the advertiser based on a profile of a subscriber. One or more advertisers and endorsement programs for the qualified subscriber are selected. In addition, when a communication transmission is received from a source communication device, at least one advertising media is associated with the communication transmission and the communication transmission is transmitted from a source communication device to a destination communication device.

18 Claims, 9 Drawing Sheets

Related U.S. Application Data application No. 13/423,048, filed on Mar. 16, 2012, now Pat. No. 8,457,670, which is a continuation of application No. 12/592,019, filed on Nov. 18, 2009, now Pat. No. 8,155,679, which is a continuation-in-part of application No. 11/318,144, filed on Dec. 23, 2005, now Pat. No. 7,664,516.

(60) Provisional application No. 60/639,267, filed on Dec. 27, 2004.

(51) Int. Cl.
| | |
|---|---|
| *H04N 21/258* | (2011.01) |
| *H04N 21/81* | (2011.01) |
| *H04L 29/08* | (2006.01) |
| *G01S 19/13* | (2010.01) |
| *G01S 5/02* | (2010.01) |

(52) U.S. Cl.
CPC ..... *G06Q 30/0241* (2013.01); *G06Q 30/0244* (2013.01); *G06Q 30/0247* (2013.01); *G06Q 30/0251* (2013.01); *G06Q 30/0252* (2013.01); *G06Q 30/0255* (2013.01); *G06Q 30/0261* (2013.01); *G06Q 30/0269* (2013.01); *G06Q 30/0276* (2013.01); *H04L 67/1091* (2013.01); *H04L 67/306* (2013.01); *H04M 15/8083* (2013.01); *H04N 21/25891* (2013.01); *H04N 21/812* (2013.01); *G01S 5/02* (2013.01); *G01S 19/13* (2013.01); *H04M 2215/0192* (2013.01)

(56) References Cited

U.S. PATENT DOCUMENTS

| | | |
|---|---|---|
| 5,448,625 A | 9/1995 | Lederman |
| 5,852,775 A | 12/1998 | Hidary |
| 5,873,068 A | 2/1999 | Beaumont et al. |
| 5,933,811 A | 8/1999 | Angles et al. |
| 5,937,037 A | 8/1999 | Kamel et al. |
| 5,999,914 A | 12/1999 | Blinn et al. |
| 6,009,150 A | 12/1999 | Kamel |
| 6,029,141 A | 2/2000 | Bezos et al. |
| 6,032,130 A | 2/2000 | Alloul et al. |
| 6,084,628 A | 7/2000 | Sawyer |
| 6,101,484 A | 8/2000 | Halbert |
| 6,181,927 B1 | 1/2001 | Welling, Jr. et al. |
| 6,269,343 B1 | 7/2001 | Pallakoff |
| 6,324,519 B1 | 11/2001 | Eldering |
| 6,351,279 B1 | 2/2002 | Sawyer |
| 6,442,529 B1 | 8/2002 | Krishan et al. |
| 6,493,437 B1 | 12/2002 | Olshansky |
| 6,519,571 B1 | 2/2003 | Guheen et al. |
| 6,604,089 B1 | 8/2003 | Van Horn et al. |
| 6,631,356 B1 | 10/2003 | Van Horn |
| 6,647,257 B2 | 11/2003 | Owensby |
| 6,691,032 B1 | 2/2004 | Irish et al. |
| 6,826,594 B1 | 11/2004 | Petterson |
| 6,856,673 B1 | 2/2005 | Banks et al. |
| 6,862,575 B1 | 3/2005 | Anttila et al. |
| 6,876,983 B1 | 4/2005 | Goddard |
| 6,934,690 B1 | 8/2005 | Van Horn |
| 6,985,879 B2 | 1/2006 | Walker et al. |
| 6,996,579 B2 | 2/2006 | Leung |
| 7,039,599 B2 | 5/2006 | Merriman et al. |
| 7,085,682 B1 | 8/2006 | Heller et al. |
| 7,107,230 B1 | 9/2006 | Halbert |
| 7,120,592 B1 | 10/2006 | Lewis |
| 7,124,099 B2 | 10/2006 | Mesaros |
| 7,124,107 B1 | 10/2006 | Pishevar et al. |
| 7,146,330 B1 | 12/2006 | Alon |
| 7,181,419 B1 | 2/2007 | Mesaros |
| 7,184,972 B2 | 2/2007 | Flaherty |
| 7,194,427 B1 | 3/2007 | Van Horn |
| 7,197,544 B2 | 3/2007 | Wang et al. |
| 7,240,843 B2 | 7/2007 | Paul |
| 7,243,082 B1 | 7/2007 | Forlai |
| 7,249,056 B1 | 7/2007 | Crouthamel et al. |
| 7,263,498 B1 | 8/2007 | Van Horn |
| 7,272,575 B2 | 9/2007 | Vega |
| 7,319,881 B2 | 1/2008 | Endo |
| 7,349,827 B1 | 3/2008 | Heller et al. |
| 7,363,246 B1 | 4/2008 | Van Horn |
| 7,389,118 B2 | 6/2008 | Vesikivi et al. |
| 7,400,711 B1 | 7/2008 | Ford et al. |
| 7,463,898 B2 | 12/2008 | Bayne |
| 7,467,103 B1 | 12/2008 | Murray et al. |
| 7,480,627 B1 | 1/2009 | Van Horn |
| 7,536,324 B2 | 5/2009 | Perkowski |
| 7,555,466 B2 | 6/2009 | Eglen |
| 7,593,871 B1 | 8/2009 | Mesaros |
| 7,599,852 B2 | 10/2009 | Bosarge et al. |
| 7,599,858 B1 | 10/2009 | Grady |
| 7,650,431 B2 | 1/2010 | Wang et al. |
| 7,664,726 B2 | 2/2010 | Jain et al. |
| 7,672,897 B2 | 3/2010 | Chung |
| 7,751,548 B1 | 7/2010 | Mashinsky et al. |
| 7,844,488 B2 | 11/2010 | Merriman et al. |
| 7,917,402 B2 | 3/2011 | Rolf et al. |
| 8,069,169 B2 | 11/2011 | Fitzpatrick et al. |
| 8,117,464 B1 | 2/2012 | Kogelnik |
| 8,292,741 B2 | 10/2012 | Burman et al. |
| 8,407,084 B2 | 3/2013 | Chuch |
| 8,419,535 B2 | 4/2013 | Miller et al. |
| 8,423,892 B1 | 4/2013 | Marsland et al. |
| 8,433,611 B2 | 4/2013 | Lax et al. |
| 8,460,107 B2 | 6/2013 | Barclay et al. |
| 8,485,878 B2 | 7/2013 | Aaron et al. |
| 8,491,395 B2 | 7/2013 | Auterio et al. |
| 8,506,409 B2 | 8/2013 | Bethke et al. |
| 8,515,825 B1 | 8/2013 | Ross et al. |
| 8,533,039 B1 | 9/2013 | Winslade et al. |
| 8,560,537 B2 | 10/2013 | Ramer et al. |
| 8,573,491 B2 | 11/2013 | Bennett et al. |
| 2001/0029464 A1 | 10/2001 | Schweitzwer |
| 2001/0044745 A1 | 11/2001 | Shaw |
| 2001/0047294 A1 | 11/2001 | Rothschild |
| 2002/0052925 A1 | 5/2002 | Kim et al. |
| 2002/0065713 A1 | 5/2002 | Awada et al. |
| 2002/0071076 A1 | 6/2002 | Webb |
| 2002/0072967 A1 | 6/2002 | Jacobs et al. |
| 2002/0077988 A1 | 6/2002 | Sasaki et al. |
| 2002/0090985 A1 | 7/2002 | Tochner et al. |
| 2002/0091569 A1 | 7/2002 | Kitaura |
| 2002/0094868 A1 | 7/2002 | Tuck et al. |
| 2002/0103647 A1 | 8/2002 | Houplain |
| 2002/0111201 A1 | 8/2002 | Lang |
| 2002/0160761 A1 | 10/2002 | Wolfe |
| 2002/0169835 A1 | 11/2002 | Paul, Jr. et al. |
| 2002/0198777 A1 | 12/2002 | Yuasa |
| 2003/0004802 A1 | 1/2003 | Callegari |
| 2003/0014307 A1 | 1/2003 | Heng |
| 2003/0032409 A1 | 2/2003 | Hutcheson et al. |
| 2003/0069785 A1 | 4/2003 | Lohse |
| 2003/0096662 A1 | 5/2003 | Lee et al. |
| 2003/0144035 A1 | 7/2003 | Weinblatt |
| 2003/0158776 A1 | 8/2003 | Landesmann |
| 2003/0172376 A1 | 9/2003 | Coffin, III |
| 2003/0177347 A1 | 9/2003 | Schneier |
| 2003/0233276 A1 | 12/2003 | Pearlman |
| 2004/0048604 A1 | 3/2004 | Idei |
| 2004/0068440 A1 | 4/2004 | Porato |
| 2004/0103023 A1 | 5/2004 | Irwin |
| 2004/0148424 A1 | 7/2004 | Berkson et al. |
| 2004/0177003 A1 | 9/2004 | Liao |
| 2004/0220851 A1 | 11/2004 | Silver et al. |
| 2005/0044483 A1 | 2/2005 | Maze et al. |
| 2005/0055409 A1 | 3/2005 | Alsarraf et al. |
| 2005/0096982 A1 | 5/2005 | Morton et al. |
| 2005/0130685 A1 | 6/2005 | Jenkin |
| 2005/0131761 A1 | 6/2005 | Trika et al. |
| 2005/0165640 A1 | 7/2005 | Kotorov |
| 2005/0192000 A1 | 9/2005 | Lloyd |
| 2005/0273351 A1 | 12/2005 | Chudnovsky |

(56) References Cited

U.S. PATENT DOCUMENTS

| | | |
|---|---|---|
| 2006/0004713 A1 | 1/2006 | Korte et al. |
| 2006/0041469 A1 | 2/2006 | Mathis |
| 2006/0041477 A1 | 2/2006 | Zheng |
| 2006/0080111 A1 | 4/2006 | Homeier Beals |
| 2006/0111967 A1 | 5/2006 | Forbes |
| 2007/0033133 A1 | 2/2007 | Pishevar |
| 2007/0043651 A1 | 2/2007 | Quan |
| 2007/0073593 A1 | 3/2007 | Perry et al. |
| 2007/0121843 A1 | 5/2007 | Atazky et al. |
| 2007/0140176 A1 | 6/2007 | Bachenberg |
| 2007/0173236 A1 | 6/2007 | Vishwanathan et al. |
| 2007/0192182 A1 | 8/2007 | Monaco |
| 2007/0203792 A1 | 8/2007 | Rao |
| 2007/0207780 A1 | 9/2007 | McLean |
| 2007/0241189 A1 | 10/2007 | Slavin |
| 2007/0244750 A1 | 10/2007 | Grannan et al. |
| 2007/0265915 A1 | 11/2007 | Gould et al. |
| 2007/0271139 A1 | 11/2007 | Fiorini |
| 2007/0281692 A1 | 12/2007 | Bucher |
| 2007/0290031 A1 | 12/2007 | Singh |
| 2008/0052169 A1 | 2/2008 | O'Shea et al. |
| 2008/0119168 A1 | 5/2008 | Farkas et al. |
| 2008/0126240 A1 | 5/2008 | Banbury |
| 2008/0133366 A1 | 6/2008 | Evans |
| 2008/0133678 A1 | 6/2008 | Woodham et al. |
| 2008/0172285 A1 | 7/2008 | Hurowitz |
| 2008/0183587 A1 | 7/2008 | Joo et al. |
| 2008/0235093 A1 | 9/2008 | Uland |
| 2008/0255966 A1 | 10/2008 | Kopelman |
| 2008/0256233 A1 | 10/2008 | Hall et al. |
| 2008/0263584 A1 | 10/2008 | Salo et al. |
| 2008/0270363 A1 | 10/2008 | Hunt et al. |
| 2008/0287150 A1 | 11/2008 | Jiang et al. |
| 2009/0005140 A1 | 1/2009 | Rose et al. |
| 2009/0017913 A1 | 1/2009 | Bell et al. |
| 2009/0030774 A1 | 1/2009 | Rothschild et al. |
| 2009/0099929 A1 | 4/2009 | Thibedeau |
| 2009/0106368 A1 | 4/2009 | Padveen et al. |
| 2009/0198622 A1 | 8/2009 | Temte |
| 2009/0204901 A1 | 8/2009 | Dharmaji et al. |
| 2009/0240629 A1 | 9/2009 | Xie |
| 2009/0287555 A1 | 11/2009 | Faraee |
| 2009/0287574 A1 | 11/2009 | Kane |
| 2009/0307145 A1 | 12/2009 | Mesaros |
| 2010/0016080 A1 | 1/2010 | Garden et al. |
| 2010/0124991 A1 | 5/2010 | O'Sullivan et al. |
| 2010/0125490 A1 | 5/2010 | Kiciman et al. |
| 2010/0287011 A1 | 11/2010 | Muchkaev |
| 2010/0318418 A1 | 12/2010 | Wertheimer et al. |
| 2011/0039623 A1 | 2/2011 | Levenson |
| 2011/0093318 A1 | 4/2011 | Guday et al. |
| 2011/0288917 A1 | 11/2011 | Wanek et al. |
| 2012/0047017 A1 | 2/2012 | Hernandez et al. |
| 2012/0078696 A1 | 3/2012 | Roark |
| 2012/0142429 A1 | 6/2012 | Muller |
| 2012/0197724 A1 | 8/2012 | Kendall |
| 2012/0239483 A1 | 9/2012 | Yankovich et al. |
| 2012/0323689 A1 | 12/2012 | Metcalf et al. |
| 2013/0054366 A1 | 2/2013 | Roundtree et al. |
| 2013/0246199 A1 | 9/2013 | Carlson |
| 2013/0290101 A1 | 10/2013 | Arini et al. |

FOREIGN PATENT DOCUMENTS

| | | |
|---|---|---|
| JP | 2006113888 | 4/2006 |
| JP | 2007219840 | 8/2007 |
| KR | 2006028602 | 3/2006 |
| WO | 1996024213 | 8/1996 |
| WO | 9946709 | 9/1999 |
| WO | 2000041121 | 7/2000 |
| WO | 0070585 | 11/2000 |
| WO | 2001011472 | 2/2001 |
| WO | 2001016853 | 3/2001 |
| WO | 2004077319 | 9/2004 |
| WO | 2007139348 | 12/2007 |
| WO | 2008141425 | 11/2008 |
| WO | 2009148338 | 12/2009 |
| WO | 2013006147 | 1/2013 |

OTHER PUBLICATIONS

*Groupon, Inc. v. Blue Calypso, LLC*; Case No. CBM2013-00034; Final Written Decision; Paper 45; Dec. 17, 2014.

*Groupon, Inc. v. Blue Calypso, LLC*; Case No. CBM2013-00035; Final Written Decision; Paper 45; Dec. 17, 2014.

*Groupon, Inc. v. Blue Calypso, LLC*; Case No. CBM2013-00044; Final Written Decision; Paper 47; Dec. 17, 2014.

*Groupon, Inc. v. Blue Calypso, LLC*; Case No. CBM2013-00046; Final Written Decision; Paper 46; Dec. 17, 2014.

Chen, Xiaoyan, et al., "An Efficient Spatial Publish/Subscribe System for Intelligent Location-Based Services," DEBS03, 2003, San Diego, USA.

"MobiPromo White-Label Wi-Fi Marketing System," MobiPromo System, (undated), http://mobipromosystem.com/mobipromo-system// #tab-id-2.

Skyhook Wireless, "Skyhook is Location," (undated), www.skyhookwireless.com.

Salim, Ali, et al., "Mobile Advertising a Case study of Mobile advertising Solutions," Bachelor Thesis, 2009, pp. 1-40, Stockholm, Sweden.

Xu, Heng, et al., "Perceived effectiveness of text vs. multimedia Location-Based Advertising messaging," Int. J. Mobile Communications, pp. 154-177, 2009, vol. 7, No. 2, Inderscience Enterprises Ltd.

Chande, Suresh, "Viral Distribution Potential Based Active Node Identification for Ad Distribution in Viral Networks", International Journal of Mobile Marketing, vol. 4 No. 1, Jun. 2009.

Aigner, Manfred Dominikus, Sandra Feldhofer, Martin; A System of Secure Virtual Coupons Using NFC Technology; PerCom Workshops '07. Mar. 19-23, 2007; pp. 362-366.

Akriga, LiveScratch Wildfire Viral Campaigns with in-built Forwarding Motivation, www.akriga.com, Feb. 22, 2005.

Avancha, Sasikanth, et al., P2P M-commerce in Pervasive Environments, ACM SIGecom Exchanges, 2003, pp. 1-9, vol. 3, No. 4.

Callegari, Jeff, NeuMobility and MapInfo Delivering Mobile Commerce Platform, MapInfo Magazine, Spring 2001, pp. 6-9, vol. 6, No. 2.

Cattelan, Renan G, et al., Prototyping a Novel Platform for the Free-Trade of Digital Content, [undated], pp. 79-88, WebMedia '06 Proceedings of the 12th Brazilian Symposium on Multimedia and the Web.

Chakraborty, Dipanjan, et al., Dreggie: Semantic Service Discovery for M-commerce Applications, Workshop on Reliable and Secure Applications in Mobile Environment, 20th Symposium on Reliable Distributed Systems, [undated], pp. 28-31.

Cost, R. Scott, et al., ITtalks: A Case Study in the Semantic Web and DAML+ Oil, Intelligent Systems, IEEE, 2002, pp. 40-47, vol. 17, No. 1.

Gao, J Kulkarni, V Ranavat, H Lee Chang Hsing Mei; A 2D Barcode-Based Mobile Payment System; Multimedia and Ubiquitous Engineering, 2009. MUE '09; Jun. 4-6, 2009; pp. 320-329.

Gao, et al. Understanding 2D-BarCode Tech and Appls in M-Commerce-Design and Implementation of a 2D Barcode Processing Solution; COMPSAC 2007; Jul. 24-27, 2007; pp. 49-56.

Sheshagiri, Mithun., et al., Using Semantic Web Services for Context-Aware Mobile Applications, MobiSys 2004 Workshop on Context Awareness, [undated].

Silverpop, Share-to-Social, www.silverpop.com/whatweoffer/ capabilities/share_to_social.html (http://web.archive.org/web/ 20081005061634/http://www.silverpop.com/whatweoffer/capabilities/ share_to_social_html), [undated].

StrongMail Influencer http://strongmail.com/technology/influencer/ index.php (web.archive.org/web/20091012003154/http://strongmail. com/technology/influencer/index.php), [undated].

Tveit, Amund, Peer-to-peer based Recommendations for Mobile Commerce, Proceedings of the 1st International Workshop on Mobile Commerce, ACM, Jul. 2001, pp. 26-29.

(56) References Cited

OTHER PUBLICATIONS

Varshney, Upkar, et al., Mobile Commerce: Framework, Applications and Networking Support, Mobile Networks and Applications, 2002, pp. 185-198, vol. 7, No. 3.
*Groupon, Inc.* v. *Blue Calypso, LLC*; Case No. CBM2013-00033; Paper 10; Dec. 19, 2013.
*Groupon, Inc.* v. *Blue Calypso, LLC*; Case No. CBM2013-00034; Paper 9; Dec. 19, 2013.
*Groupon, Inc.* v. *Blue Calypso, LLC*; Case No. CBM2013-00035; Paper 11; Dec. 19, 2013.
*Groupon, Inc.* v. *Blue Calypso, LLC*; Case No. CBM2013-00044; Paper 9; Jan. 17, 2014.
*Groupon, Inc.* v. *Blue Calypso, LLC*; Case No. CBM2013-00046; Paper 9; Jan. 17, 2014.
Castella-Roca, Jordi, et al. "An Incentive-Based System for Information Providers Over Peer-to-Peer Mobile Ad-Hoc Networks", MDAI 2007, LNAI 4617, pp. 380-392, 2007.
Muhlhauser, Max, et al. "Collaboration in Opportunistic Networks", Dissertation, Apr. 30, 2007.
Shojima, Taiki, et al. "An Incentive Attached Peer to Peer Electronic Coupon System", Studies in Informatics and Control, vol. 13, No. 4, Dec. 2004.
Almeroth, Kevin, et al. "Coupons: Wide Scale Information Distribution for Wireless Ad Hoc Networks", undated.
Kato, H. Tan, K.T.; 2D barcodes for mobile phones; Mobile Technology, Applications and Systems, 2005 2nd International Conference on; Nov. 15-17, 2005; p. 8.
Kauffman, R. and Wang, B., Bid Together, Buy Together: On the Efficacy of Group-Buying Business Models in Internet-Based Selling. "The (R)evolution Goes Mobile", 5th Annual University of Minnesota Electronic Commerce Conference, Mar. 27-28, 2001. Minneapolis, MN.
Klepp, JT, Sharing on a Small Screen, Feb. 2008, MoConDi Ltd.
Ko, Young-Bae, et al., Geocasting in Mobile Ad Hoc Networks: Location-Based Multicast Algorithms, Proceedings of the 2nd IEEE Workshop on Mobile Computing Systems and Applications, [undated], pp. 101-110.
Koung-Lung Lin Hsu, J.Y.-J. Han-Shen Huang Chun-Nan Hsu; A recommender for targeted advertisement of unsought products in e-commerce; CEC 2005; Jul. 19-22, 2005; pp. 101-108.
MacEachren, Alan M., et al., Geographic Visualization: Designing Manipulable Maps for Exploring Temporally Varying Georeferenced Statistics, Proceedings of IEEE Information Visualization Symposium, Research Triangle, [undated], pp. 87-94.
Ming, Lok Jing, Peer-to-peer Personalized Mobile Ad Hoc Advertising Framework, Apr. 2005, Malaysia University of Science and Technology.
Navas, Julio C., et al., Geocast—Geographic Addressing and Routing, Proceedings of the 3rd Annual ACM/IEEE International Conference on Mobile Computing and Networking, [undated], pp. 66-76.
Neumobility, Neutrac Platform, [undated], Seattle, Washington.
Perich, Filip, et al., Profile Driven Data Management for Pervasive Environments, [undated], pp. 361-370, Database and Expert Systems Applications, Springer Berlin Heidelberg.
Poparmedia, Inc., Comparing Social Media Marketing Tactics: Beyond Viral Videos and Refer-a-Friend Programs, 2008, San Francisco, California.
Purpleace, Ripple Discover, Apr. 2004, Singapore.
Ratsimor, O., et al., eNecentive: A Framework for Intelligent Marketing in Mobile Peer-to-Peer Environments. Oct. 2003. ICEC '03 Proceedings of the 5th International Conference on Electronic Commerce. pp. 87-94.
Ratsimor, O., et al., Intelligent Ad Hoc Marketing within Hotspot Networks. Technical Report TR-CS-03-27. Nov. 2003.

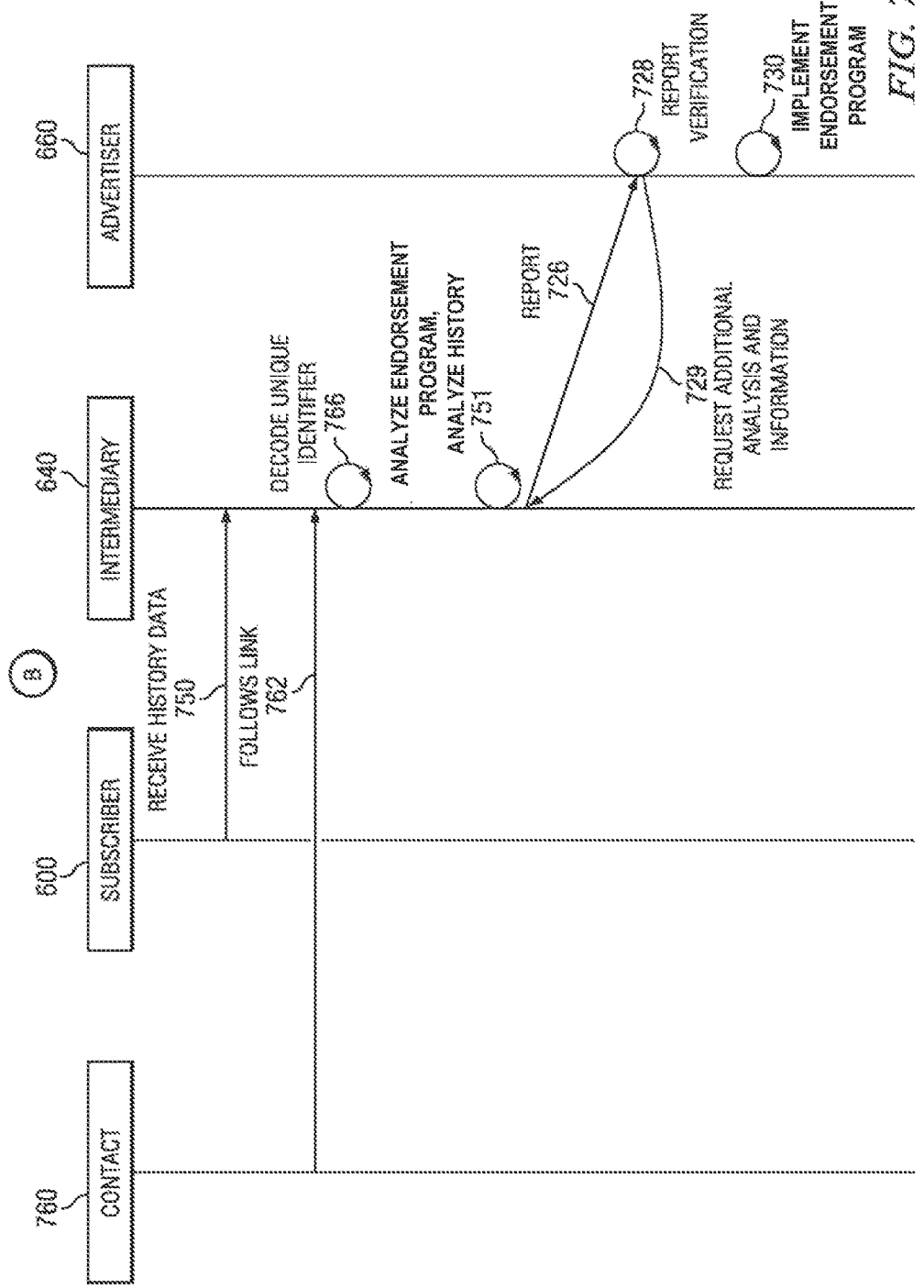

SYSTEM AND METHOD FOR DISTRIBUTION OF TARGETED ADVERTISING BETWEEN MOBILE COMMUNICATION DEVICES

CROSS-REFERENCE TO RELATED APPLICATIONS

This application is a continuation-in-part application of U.S. patent application Ser. No. 13/908,825, filed on Jun. 3, 2013, which is a continuation application of U.S. patent application Ser. No. 13/423,048, filed on Mar. 16, 2012, now U.S. Pat. No. 8,457,670, which is a continuation of U.S. patent application Ser. No. 12/592,019, filed on Nov. 18, 2009, now U.S. Pat. No. 8,155,679, which is a continuation-in-part of U.S. patent application Ser. No. 11/318,144 filed on Dec. 23, 2005, now U.S. Pat. No. 7,664,516, which claims priority to U.S. Provisional Patent Application No. 60/639,267 filed on Dec. 27, 2004. Each patent application identified above is incorporated here by reference in its entirety to provide continuity of disclosure.

BACKGROUND OF THE INVENTION

As mobile technologies evolve into highly sophisticated two-way communication systems including smart phones, instant messaging devices, and personal digital assistants (PDA), the adoption and usage of such technologies continue to increase at a rapid rate. Advertisers are highly motivated to identify new methods of creating brand awareness to users. One of these methods is known as advertising impressions. Leveraging mobile technologies as described above, advertising impressions provide brand awareness by directly displaying company approved content, such as advertisements.

In addition to advertisers, users may utilize these technologies to select specific advertisers who may reach them. For example, technologies like personal digital video recorders allow users to skip undesirable advertisements. In addition, technologies, such as a subscription of satellite radio, allow users to listen to music without the disruption of commercials.

With the declining ability to offer advertisements through traditional broadcast advertising medium, such as public radio and television, a need exists for a method that offers more frequent and effective direct advertising to peer-to-peer users.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 7*c* describes the execution of a program with the subscriber.

DETAILED DESCRIPTION

Figure 1:
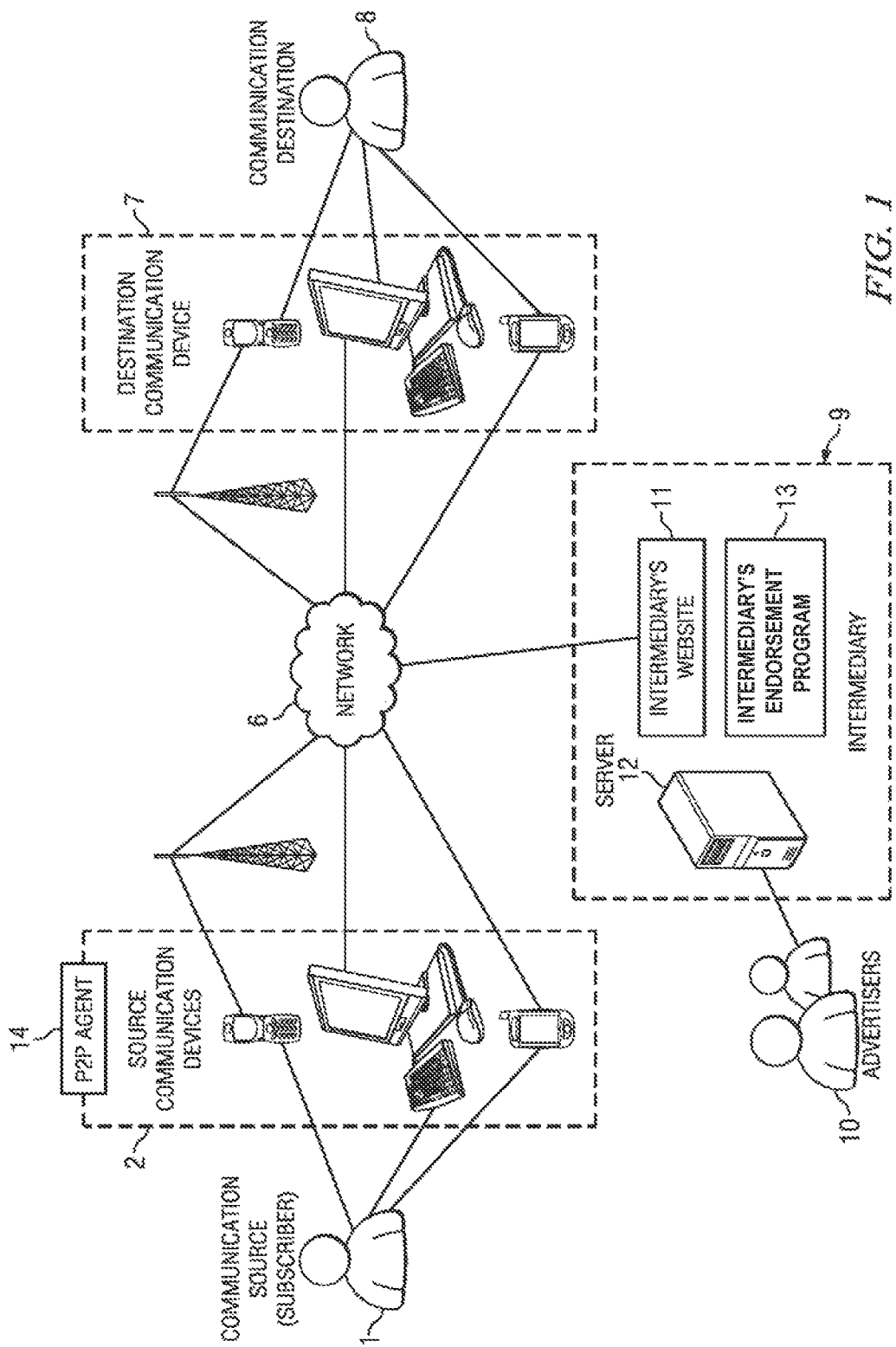
FIG. 1 is a diagram of exemplary components for providing advertising between peer-to-peer communication devices.

It is to be understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Aspects of the present disclosure provide effective transmissions of advertisements preceding and following transmissions of peer-to-peer communications, which occur directly between peer-to-peer communication devices. Examples of peer-to-peer communication devices include cellular phones, personal digital assistants (PDA), personal computers, instant messaging devices, and audio devices.

FIG. 1 is a diagram of exemplary components for providing direct advertising between peer-to-peer communication devices. A communication source, such as subscriber 1, subscribes to endorsement program 13 of intermediary 9. In an illustrative embodiment, endorsement program 13 of the intermediary 9 is directed in whole or in part by advertisers 10. The endorsement program 13 may be developed using an object-oriented programming language, such as Java™ or C++, C#, or other programming languages.

When a communication transmission (a cellular phone call, a video conferencing session, an instant message, text message (SMS, MMS or other), a personal computer communication, or a voice communication) is initiated by the subscriber 1 to a communication destination 8, an advertisement preceding and/or following the communication is transmitted to a destination communications device 7 used by communication destination 8. The subscriber 1 may utilize a source communication device 2, such as a cellular phone, a personal computer, a personal digital assistant, or an instant messaging device, to initiate the communication. Source communication device 2 may be coupled to a network 6 and may communicate with destination communication device 7 via the network 6 using a communications protocol. Examples of network 6 may be the Internet, a private network, a cellular phone network, or other service provider networks. Examples of the communication protocol include Transmission Control Protocol/Internet Protocol (TCP/IP), Global System for Mobile Communications (GSM), Code Division Multiple Access (CDMA), and Wireless Application Protocol (WAP).

Operating systems running on communication devices 2 and 7 coordinate and provide control of various components. Each operating system may be a commercially available operating system such as Microsoft® Windows® Mobile (Microsoft and Windows are trademarks of Microsoft Corporation, Redmond, Wash.). An object-oriented software system, such as the Java™ software system may run in conjunction with the operating system and provide calls to the operating system from Java™ programs or applications executing on communication devices 2 and 7. (Java is a product available from Sun Microsystems, Inc, of Santa Clara, Calif.) It is understood that the present disclosure may be used with other operating systems and applications written using other programming languages.

When the communication transmission is received by destination communication device 7, the advertisement may be displayed, played, or confirmed. The source of the advertisement may be announced to the recipient as being endorsed by the advertisers 10, an independent entity, an Internet service provider, a telecommunication service provider, or other types of communication providers. It is understood that FIG. 1 is intended as an example, and not as an architectural limitation for different embodiments of the present disclosure.

Figure 2:
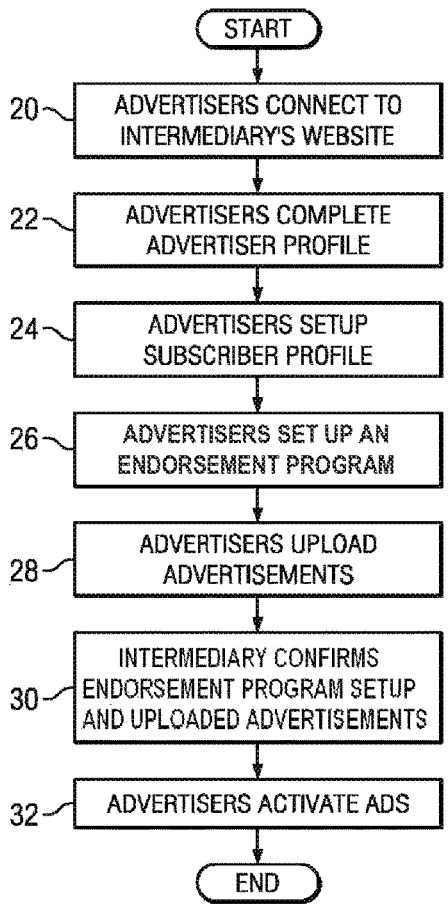
FIG. 2 is a flowchart of an embodiment of an advertiser setup process.

FIG. 2 is a flowchart of an embodiment of an advertiser setup process. Advertisers 10 may create and manage their own endorsement programs or choose to participate in an intermediary's separately managed endorsement program 13. An endorsement program may include a protocol for choosing and receiving a product or service, scheduling pick-up or delivery of a product or a service, or scheduling a review or inspection of a product or service. An endorsement program may also include any grouping of products or services or the election of receiving delivery of a product or service. Further, an endorsement program may include delivery of multiple products or services, different products or services or a different quality of products or services, based on participation in the endorsement program by one or more subscribers or recipients. Such an endorsement program can further include the delivery of additional or supplementary products, or services based on the choices made by the subscriber or recipient. In the event of the advertisers choosing an intermediary's endorsement program 13, advertisers 10 are required to complete a setup process, receive approval of their profile by the intermediary from a technical and procedural context, and upload their desired ads to be used in the intermediary's endorsement program 13 before advertisements may be offered.

In step 20, advertisers 10 connect to or browse the intermediary's website 11. The intermediary's website 11 may reside in a server 12 managed by the intermediary 9. In step 22, advertisers 10 complete an advertiser profile on the intermediary's website 11 identifying the advertisers' criteria. In step 24, advertisers 10 setup a subscriber profile on the intermediary's website 11 identifying necessary demographic criteria of a desirable subscriber 1.

In step 26, advertisers 10 set up an endorsement program. Endorsement program 13 can include promotions which enable advertisers 10 to select or "endorse" desirable subscribers in order to facilitate delivery of advertisements and advertising content, selection and delivery of products or services, arrange for delivery of products or services, or change the frequency or speed of a delivery of products or services. Other functions such as storage, product location, product and service evaluations and comparisons between products and services, as well as advertising for similar products and services can also be facilitated by information provided in the endorsement program. The advertisers 10 may provide other choices to subscriber 1, related to their products and/or services and elections to receive products and/or services without departing the spirit and scope of the present disclosure. The selection of subscribers may be based on a matching of the subscribers' criteria against the advertisers' criteria.

In addition, endorsement program 13 enables advertisers 10 to identify what products or services the subscriber receives in accordance with certain performance criteria. An example of performance criteria includes the number of communication transmissions the subscriber has made and the length of the transmissions. Furthermore, the identification process may be standardized based upon other categorical groupings. An example of categorical groupings includes allowing the subscriber to be endorsed by a different advertiser for each communication event based on an election to receive products or services, a type of product or service or a target schedule for product or service delivery.

In step 28, advertisers 10 upload their advertisements, which may be in a form of text, audio, video, static graphic, or other advertising media, to the intermediary's website 11 to be later associated with one or more subscriber's communications. Advertisers 10 also have the ability to identify when and how to apply each advertisement media type based upon a set of rules or logic defined by either the advertisers 10 themselves or the intermediary 9.

In step 30, the intermediary 9 confirms with advertisers 10 that the endorsement program is ready for use and that the setup is complete. Advertisers 10 may then elect, through a secure login process, to execute the endorsement program themselves in order to test their advertisements and adjust the advertisements as necessary. Otherwise, in step 32, advertisers 10 may activate one or more advertisements for selection by the subscriber 1. Thus, the process is complete.

Figure 3:
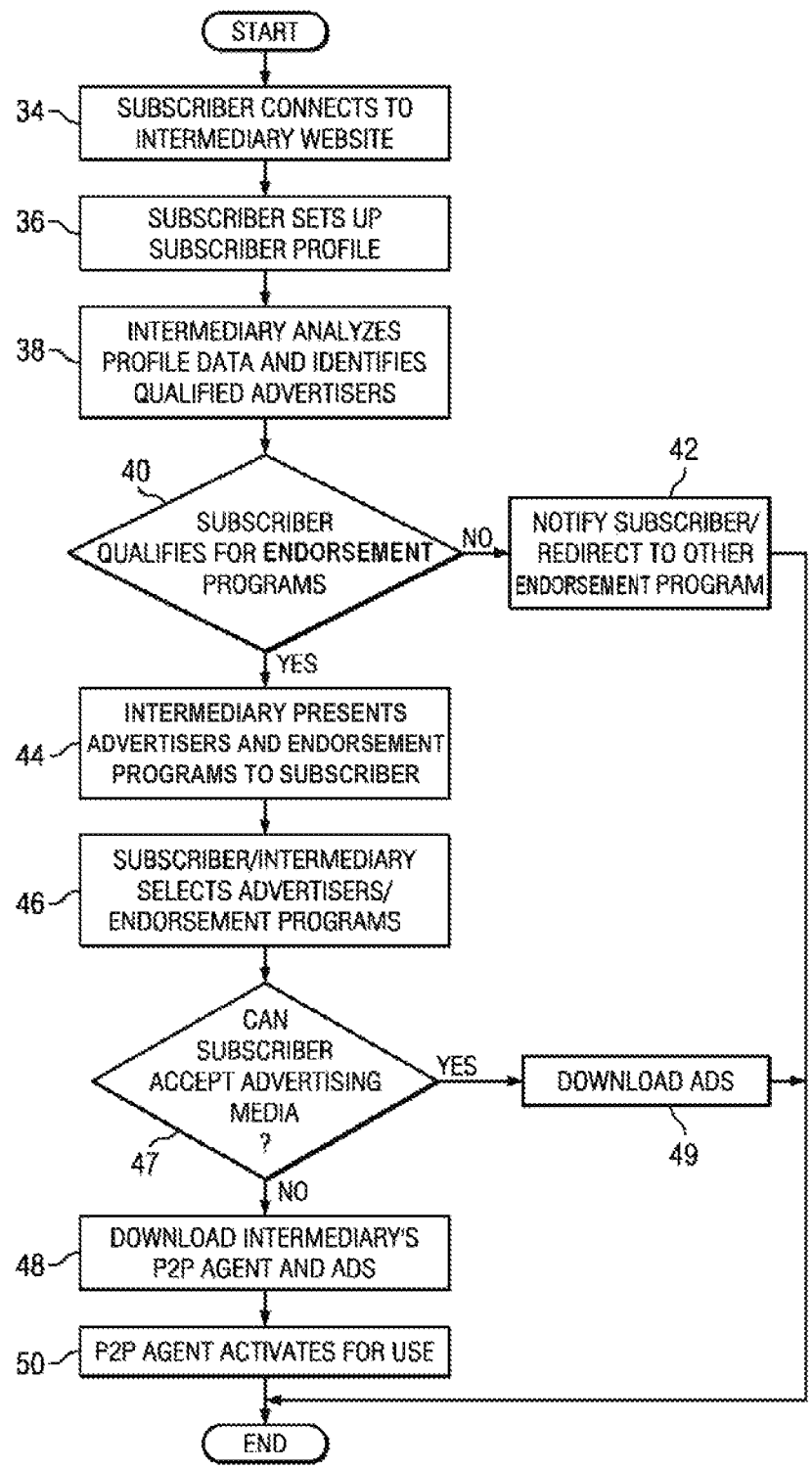
FIG. 3 is a flowchart of an embodiment of a subscriber setup process.

FIG. 3 is a flowchart of an embodiment of a subscriber setup process. To become a subscriber, in step 34, a source communication device 2 owner or subscriber 1 must first connect to the intermediary website 11. In step 36, subscriber 1 sets up a subscriber profile and qualifies for the endorsement program.

Alternatively, the subscriber 1 may be automatically enrolled in endorsement program 13 as a result of a relationship with a service provider, such as a cell phone company contract, an existing service provided by an Internet service provider or by other communication service providers, or endorsers such as a product retailer who distributes branded communications devices that are limited to endorsing only their brand through approved subscribers. The subscriber profile includes information regarding the subscriber 1, for example, a name, an address, a device type, a serial number of the device, a phone number of the device, an IP Address of the device, basic demographic information of the subscriber 1, and a carrier calling program. Other characteristics of the service provider's program, such as available minutes and the subscriber's usage history may also be collected.

Once the subscriber's profile is set up, in step 38, the intermediary 9 analyzes the profile data and identifies advertisers 10 whose criteria match the subscriber's criteria. For example, advertiser A offers static graphic media and video media and advertiser B offers only audio media. Based on the media type offered, the intermediary 9 qualifies those subscribers whose communication devices have the capability to accept static graphics, video, and/or audio. The intermediary 9 may also require the subscriber 1 to qualify for an endorsement program over a trial period of time in order to quantify and qualify the calling habits of subscriber 1. For example, the intermediary 9 may examine the usage history of subscribers and qualify only those subscribers who are communicating with others most frequently.

In step 40, a determination is then made by the intermediary 9 as to whether the subscriber qualifies for the endorsement program. In step 42, if the subscriber 1 does not qualify, the subscriber 1 is notified that the setup process may not continue, and the process terminates. Alternatively, subscriber 1 may be redirected to another endorsement program or given information on how to qualify in the future.

In step 44, if subscriber 1 qualifies, intermediary 9 presents all acceptable advertisers 10 and endorsement programs available, including the criteria required to qualify for each endorsement program to subscriber 1. In step 46, subscriber 1 or intermediary 9 may select one or more advertisers 10 and/or endorsement programs containing multiple advertisers or advertisements for endorsement. Endorsement program 13 may include other random or targeted advertisements that the subscriber fails to select.

In step 47, a determination is made by intermediary 9 as to whether subscriber 1 has the capability to accept the advertisements for endorsement. In step 49, if the subscriber has the capability to accept the advertisements, the advertisements are downloaded to the subscriber 1. In step 48, if the subscriber 1 does not have the capability to accept the advertisements, an intermediary's endorsement manger software 14 is downloaded to the subscriber's source communication device 2 followed by the advertiser's ads. The endorsement manager software 14 manages advertisements, formats communication transmissions with the advertisements, and records advertising impression history of the advertisement transmissions periodically. In step 50, once the endorsement manger software 14 and advertiser's advertisements are downloaded, the endorsement manger software 14 communicates securely with the intermediary's host system and activates itself for use.

Figure 4:
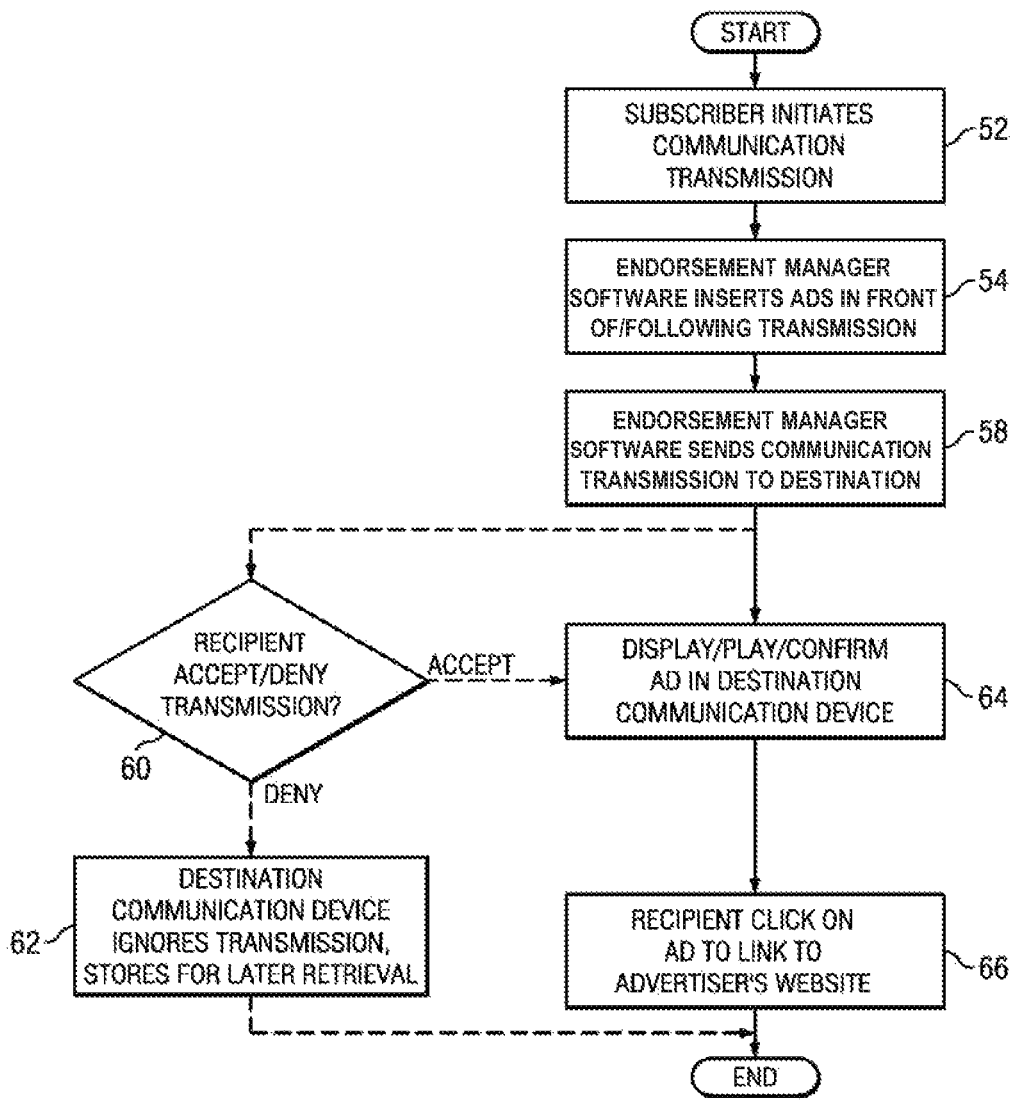
FIG. 4 is a flowchart of an embodiment of a communication process.

FIG. 4 is a flowchart of an embodiment of a communication process. The communication process begins, in step 52, when a communication transmission is initiated by a subscriber 1. A communication transmission may include a cellular phone call, an instant message, a page, or a video conferencing session, and may be initiated using any source communication device 2. In step 54, the endorsement manger software 14 formats the transmission by inserting the appropriate advertiser's advertisement preceding and/or following the transmission. During the communication session, the endorsement manager software 14 records the impression status based on whether the advertisement was displayed, played, or confirmed on the destination communication device 7.

In step 58, once the transmission is formatted, the endorsement manager software 14 sends the communication transmission to the communication destination 8. In step 64, when the communication transmission reaches the destination communication device 7, the advertisement is displayed, played, or confirmed in the destination communication device 7. In step 66, at the end of the communication session, the recipient may click on the advertisement to link, via the Internet, to the advertiser's or another designated website for additional information or further action. The link may direct the recipient to a portal that facilitates acquisition of products and services and/or the delivery or delivery scheduling of products or services. In addition, advertisers 10 may transmit their own messages to the recipient any time during or after the communication process.

Optionally, in step 60, when the communication transmission is initially received by the destination communication device 7, a determination is made by a recipient of the destination communication device 7 as to whether to accept or deny the transmission. In step 62, if a transmission is denied, the transmission is selectively ignored, and is stored in a voice mail or similar system for later retrieval. In step 64, if the transmission is accepted or is retrieved from voice mail or other storage system, the advertisement is displayed, played, or confirmed in the destination communication device 7. The advertisement may be played, displayed or confirmed followed by, at the same time, or throughout the communication session. In step 66, at the end of the communication session, the recipient may click on the advertisement to link, via the Internet, to the advertiser's or another designated website for additional information. The process then terminates.

Figure 5:
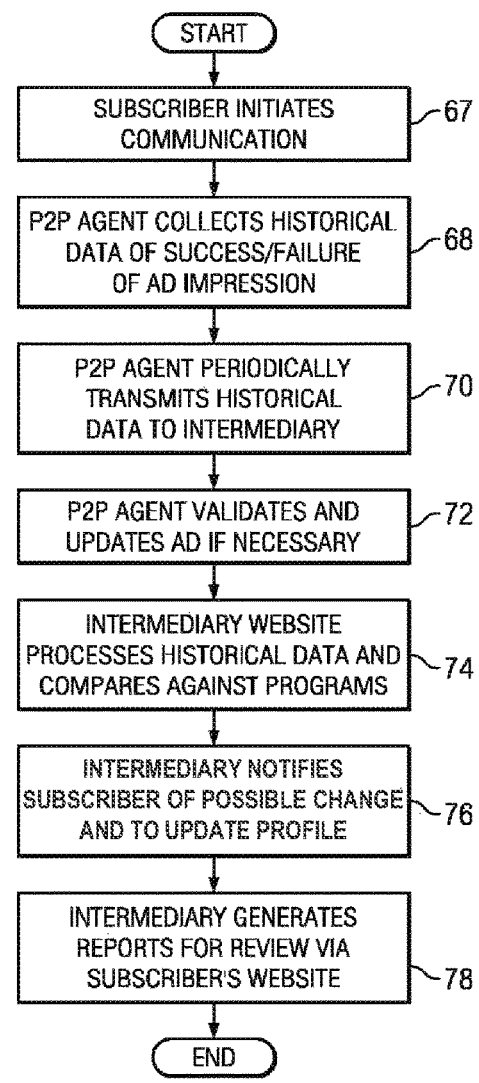
FIG. 5 is a flowchart of an embodiment of a subscription maintenance process.

FIG. 5 is a flowchart of an embodiment of a subscription maintenance process. Subscription maintenance includes collecting regular advertising impression data from the endorsement manager software of the subscribers, periodic processing of the impression data against endorsement programs to facilitate acquisition, distribution and delivery scheduling of products or services, or changes to the subscriber's profiles, or endorsement program eligibility.

The process begins, in step 67, when a communication transmission is initiated by the subscriber 1. In step 68, the endorsement manager software 14 collects historical data from the subscriber, including successes and failures of advertising impression events. Examples of advertising impression events include the number of advertising impressions, the number of advertising media types that have reached and been accepted by the destination communication device, the number of advertising impressions for a certain party, and the like. In step 70, the endorsement manager software 14 transmits this historical data to the intermediary's data warehouse for further processing. In step 72, the endorsement manager software automatically validates and updates current versions of advertiser's advertisements, and the endorsement manager software 14 updates itself, if necessary. The intermediary 9 may also periodically update the advertisements as the endorsement manager software 14 is busy communicating with the intermediary's data warehouse to "check in".

In step 74, upon receipt of the historical data, the intermediary website 11 processes the received historical data and compares the data against the endorsement programs for which they have qualified in step 40 in order to determine which products or services will be acquired and/or delivered, in what amounts, to which recipients and on what schedules. In step 76, if the intermediary 9 detects that the terms of an endorsement program are likely to change, the intermediary 9 sends a message to the subscriber 1 informing the subscriber 1 of a possible change or a need to update the subscriber profile. In step 78, the intermediary 9 generates reports to advertisers, service providers, and subscribers for review via the intermediary's website 11. Based on these reports, advertisers and subscribers may re-adjust their profiles.

The system and method described above enables advertisers 10 to reach targeted audiences via mobile communications devices. The recipient of a communication transmission accepts the communication session initiated by a source communication device 2, because the session is identified as being initiated by a trusted or known entity. Upon acceptance, the advertising media is played or displayed to the recipient. Additional products or services may be provided to subscribers to encourage participation in the endorsement programs.

Other scenarios include communication sessions in which the subscriber 1 is a recipient of the communication session initiated by a non-subscriber. In this case, the endorsement manager software 14 in the destination communication device 7 may insert the advertising media into the communication session prior to enabling the communication between the subscriber 1 and the non-subscriber. The advertising media is played or displayed to the subscriber 1, who is designated to receive the products or services according to the endorsement program based on this communication session.

Figure 6:
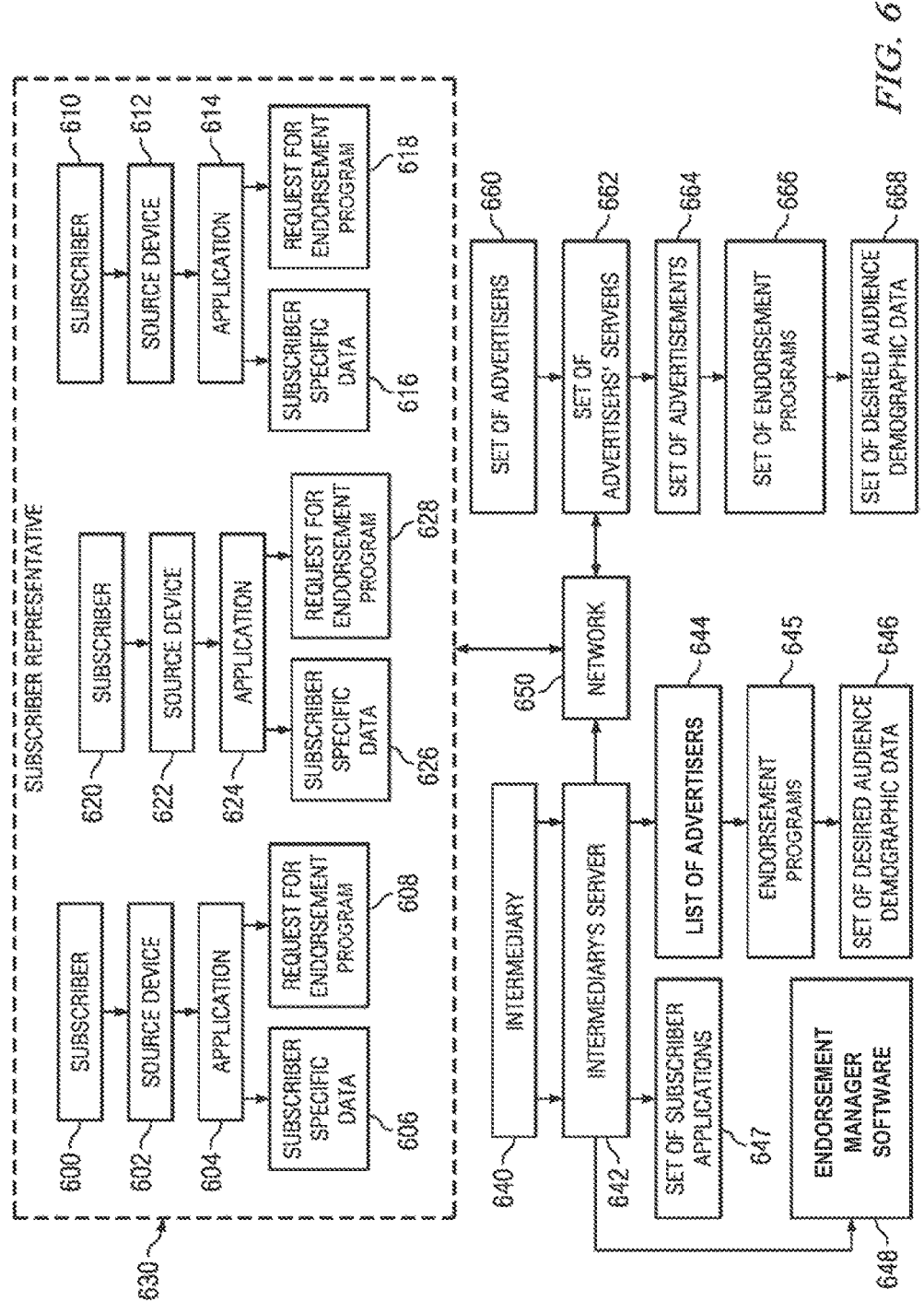
FIG. 6 is a diagram showing communication between the subscriber, intermediary, and the endorsement companies.

FIG. 6 is a diagram showing communication between the subscriber, intermediary, and the advertisers. The set of subscribers 600, 610 and 620 possess source devices 602, 612 and 622. Subscribers 600, 610 and 620 communicate in a similar manner and will be described using subscriber 600 as an example.

Subscriber 600 creates application 604. Application 604 consists of a request for endorsement and a choice of products or services for delivery 608, as well as subscriber specific data 606. Subscriber specific data 606 is demographic data that relates to the subscriber's education, employment, interests, hobbies, affiliations or other data used to determine a target market for a product or service.

An advertiser selected by the subscriber may provide an endorsement or endorsement tag (i.e. "advertiser recommends subscriber"). Alternatively, the subscriber may offer to endorse the company (i.e. "subscriber recommends advertiser"). The endorsement may include an embedded company logo, color or link to an advertisement of a particular product or service. The advertisement that the link points to is controlled by the advertiser and may be redirected by the intermediary. In the preferred embodiment, the intermediary serves as the hosting site for product or advertising data. In other embodiments, the intermediary and the hosting site may be located at different machines Subscriber 600 communicates with intermediary 640 through source device 602, network 650 and the intermediary's server 642. Subscriber 600 communicates with any of the set of advertisers 660 through source device 602, network 650 and set of servers 662.

Intermediary 640 communicates with network 650 through intermediary's server 642. Additionally, list of advertisers 644, set of subscriber applications 647 and endorsement manager software 648 for subscriber's devices reside on intermediary's server 642.

List of advertisers 644 includes endorsement programs 645 corresponding to specific advertisers. The list of advertisers 644 includes the nature of the products or services and an outline of the acquisitions or deliveries that may be provided. Endorsement opportunities 645 include a set of desired demographic data 646. Desired demographics 646 relate to a target market that an advertiser is trying to reach with its ad campaign and endorsement programs.

Set of subscriber applications 647 are applications 604, 614, 624 that have been submitted to the intermediary via network 650 or otherwise entered into the intermediary's server 642.

Endorsement manager software 648 is downloaded to source device 602, 612, 622 via network 650. As described earlier, endorsement manager software 648 allows subscribers 600, 610, 612 to accept and forward endorsements and advertisements.

Set of advertisers 660 communicates with network 650 through set of servers 662. Servers 662 contain set of advertisements 664. Set of endorsement programs 666 are related to individual advertisements from the set of advertisements 664. The endorsement programs 666 contain a set of desired audience demographic data 668 which relate to a target market selected by an advertiser.

Figure 7A:
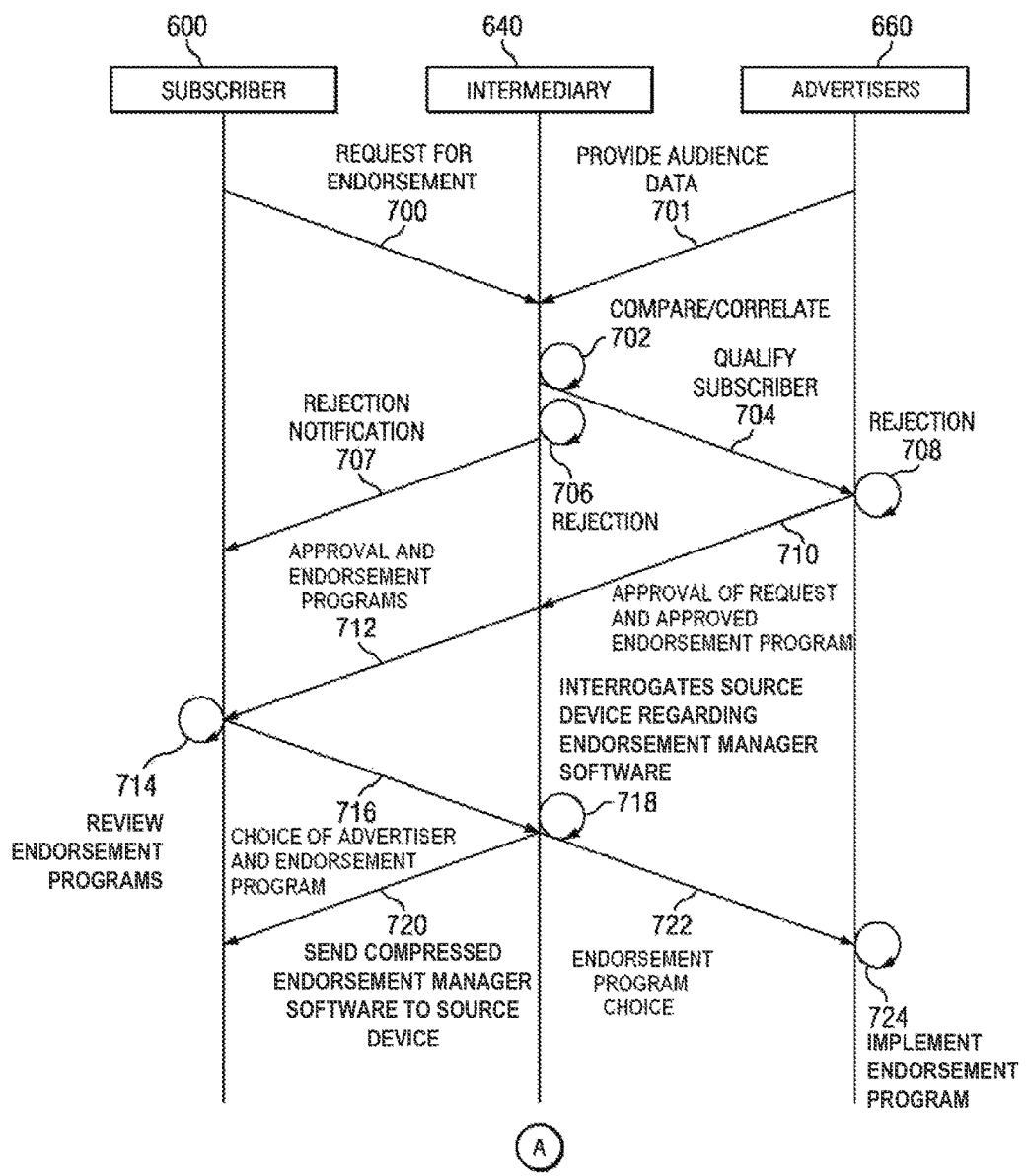
FIG. 7*a* describes the interactions between the subscriber, intermediary and advertiser nodes during the enrollment process.

FIG. 7*a* describes the bi-directional endorsement process between the subscriber and the advertiser via the intermediary during the enrollment process. Subscriber 600, intermediary 640 and advertiser 660 represent "nodes" or "tiers" in a computer network. Each node or tier may represent a communication device and the appropriate computer server and computer network connections to allow communication and passing data between subscriber 600, intermediary 640 and advertiser 660. The nodes may also represent groups of machines in a network confirmation. The nodes do not reflect (nor require) a specific carrier or service provider for the source device.

At step 700, subscriber 600 contacts intermediary 640 through network 650 using source devices 602 and makes a subscription request including a request for endorsement. At this step, subscriber 600 selects one or more potential endorsers from list of advertisers 644. Subscriber 600 submits application 604, including the selected advertisers and subscriber demographic data, to intermediary 640. At step 701, advertiser 660 contacts intermediary 640. Advertiser 660 submits one or more sets of desired demographic criteria to intermediary 640.

At step 702, intermediary 640 correlates the subscriber data with the set of demographic data criteria of the advertiser. A correlation value is assigned by intermediary 640.

In the preferred embodiment, the correlation value is calculated as a match value or weighted percentage between the demographic criteria 646 and the subscriber demographic data.

Other correlation routines can be used to provide additional metrics to the subscriber and the advertiser related to the "match" of the subscriber demographic data with the advertiser criteria. For example, a multipoint questionnaire is provided to the subscriber including various categories during the subscription process. Questions include multiple choice questions. Answers to the multiple choice questions and each of the categories are assigned a weight. The combined weight is provided to the advertiser and to the subscriber as a correlation value.

At step 702, advertiser 660 receives the subscriber specific data from intermediary 640. Advertiser 660 then correlates subscriber specific data 606 with desired audience demographic data 668 to derive a correlation value.

At step 704, a list of potential subscribers that meet a desired correlation value for endorsement are forwarded to advertiser 660.

At step 706, potential subscribers who score lower than the required correlation value are recommended for rejection. Intermediary 640 notifies subscriber 600 of a rejection at step 707. If the subscriber is rejected, the rejection is recorded by the intermediary and the process stops.

At step 708, the advertiser decides whether to endorse a particular subscriber, based on the results of the correlation. The advertiser determines the endorsement program details. For example, subscriber 600 that achieves a high correlation value may receive different products or services than the subscriber who achieves a low correlation value.

If a sufficient correlation value is achieved or the subscriber provides an endorsement, the subscriber is deemed a "qualified" subscriber. At step 710, the advertiser notifies intermediary 640 of the endorsement program for which the subscriber has been qualified. Intermediary 640 then notifies subscriber 600, at step 712.

At step 714, subscriber 600 reviews the endorsement programs. At step 716, subscriber 600 chooses at least one endorsement program and an advertiser for endorsement and notifies intermediary 640. At this point, bi-lateral endorsement is complete.

At step 718, intermediary 640 interrogates source device 602 regarding its ability to perform the requirements of the endorsement manager software. For example, source device 602 may not be capable of sending an endorsement with an embedded link or may not be capable of handling large graphics files.

At step 720, depending on device capabilities, intermediary 640 sends a compressed file containing the endorsement manager software and the endorsement program selected by subscriber 600 to source device 602. In the preferred embodiment, the endorsement manager software manages the endorsement program and history related to the endorsement. The endorsement manager software is sent, along with a set of links to various advertisements, endorsement tags and graphics files. The endorsement manager software is then decompressed and installed on the source device.

At step 722, the advertiser is notified of the endorsement program or programs selected by subscriber 600. The selected endorsement programs are implemented by the advertiser in step 724.

The bi-directional selection process allows the subscriber to select advertisers that are appealing. The advertiser then determines if the subscriber is qualified based on a correlation between the subscriber's demographics and those desired by the advertiser. The subscriber's contacts presumably share some, if not all, of the subscriber's demographics and interests. Therefore, the contacts provide a select market and value to the advertiser, while requiring only a single demographic comparison. This allows an advertiser to focus its endorsements on favorable target markets without having to qualify each possible customer or examine demographics of a large number of potentially bad prospects.

Figure 7B:
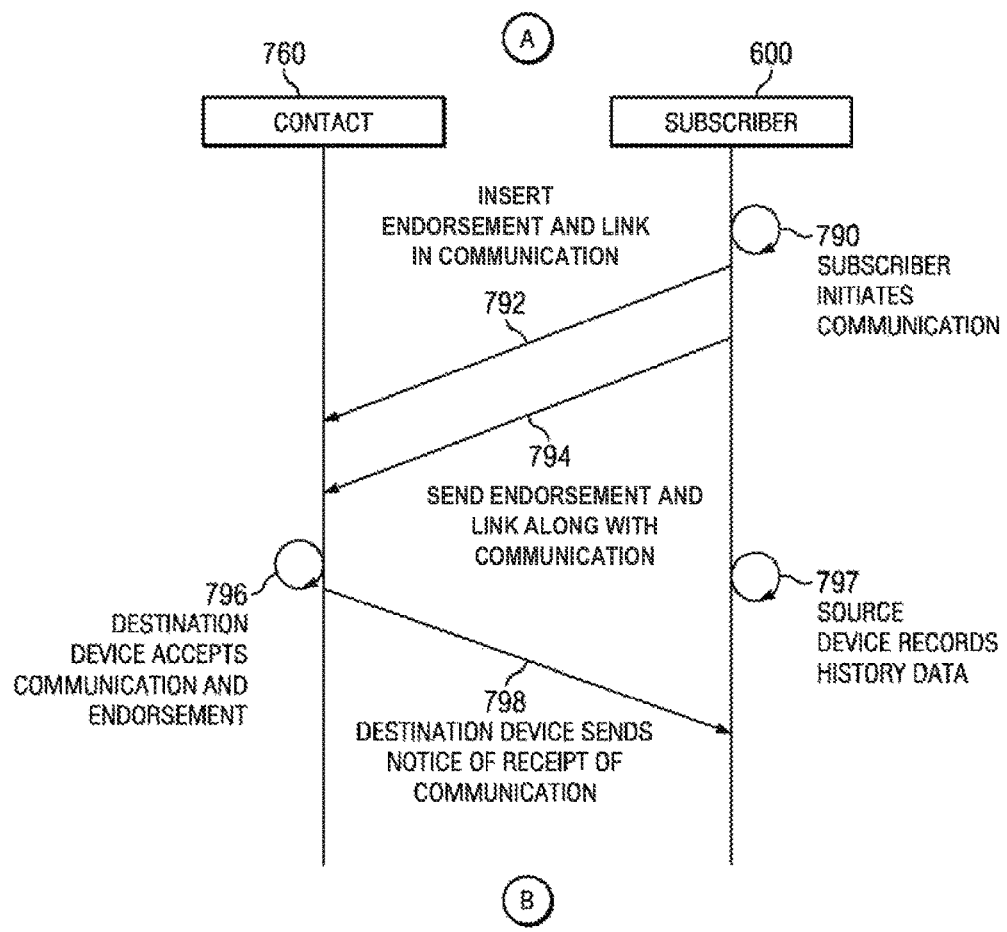
FIG. 7*b* describes a communication and the recording of historical data.

FIG. 7b describes communication and recording of historical data. At step 790, subscriber 600 initiates a communication with contact 760 in possession of a destination communication device. At steps 792 and 794, the endorsement manager software inserts and sends an endorsement and embedded link in the communication. The destination device accepts the communication and embedded link and sends a response to the source device in steps 796 and 798. The source device records the historical data in step 797.

FIG. 7c describes the data flow required for implementation of the endorsement program. At step 750, the intermediary receives history data from the subscriber 600 reflecting a communication with contact 760, such as a phone can where an imbedded link has been sent in an endorsement message. At step 762, contact 760 follows the link embedded in the endorsement to the advertisement data hosted by intermediary 640. Intermediary 640 monitors historical data including the number of endorsements sent by subscriber 600 and the number of recipients contacted by subscriber 600 that use the embedded link to view the advertisement from the set of advertisements 664. Individual contacts are identified by a unique identifier embedded in each endorsement sent by subscriber 600 to contact 760. At step 766, the unique identifier is decoded by the intermediary site 640, allowing identification of the contact 760 responding to the endorsement. At step 751, the intermediary analyzes the endorsement program and analyzes the subscriber history data and contact interaction history.

The endorsement and the embedded link may be altered in response to various stimuli. For example, a random function may be provided in the software to change the endorsement and/or embedded link resulting in random changes. In another example, the endorsement and/or embedded link may be changed to reflect a different product of the advertiser at different times of day. Additionally, when the embedded link is activated additional information may be sent from the destination device, such that the geographical location of the destination device is known. Intermediary site 640 may redirect the embedded link to a new advertisement based on geographical, time, data or previous responses by the destination device. Intermediary site 640 determines the geographical location of the device by determining which cellular tower is carrying the response from the destination device or by information supplied by the destination device, such as GPS coordinates. The endorsement and embedded link can also be configured to respond to specialized applications or "apps" resident on the source device to reflect changing conditions dictated by the app. For example, an application may be capable of reflecting ringtone changes and/or music preference changes. In these applications listening habits and cell phone configurations for various lighting displays can supply information to trigger predetermined variations in the endorsement or embedded link.

For example, if the embedded link were to a national restaurant chain, intermediary site 640 may redirect it to an advertisement for the nearest restaurant. Intermediary site 640 may contain the hours of operation of the restaurants and direct the link to an advertisement for the nearest open restaurant. If no restaurants are open within a predetermined range, intermediary site 640 may select an alternative advertisement. Intermediary site 640 may also store data regarding previous interaction from the destination device and redirect the link accordingly. For example, an endorsement program may be limited to one per device, such that intermediary site 640 redirects the destination device to a different link if an offer has been previously accepted. Alternately, a source device may receive additional products or products of better quality for frequently following the link embedded within an endorsement.

Figure 9:
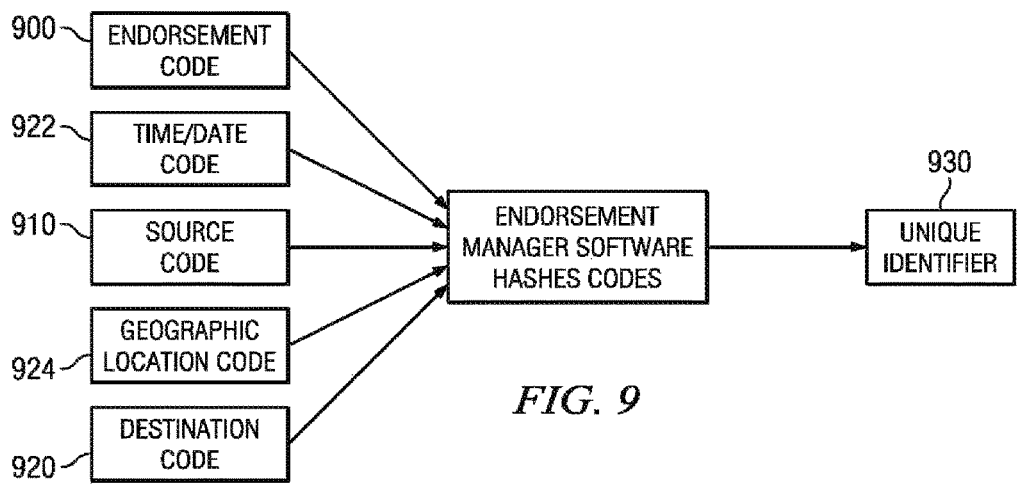
FIG. 9 describes the creation of a unique identifier for each endorsement sent by the subscriber to a contact.

Referring briefly to FIG. 9, in an alternate embodiment, historical data regarding interaction of contact 760 with the embedded link may be stored on the source device as previously described. Alternatively, the endorsement sent to the contact from the source device contains a hash of three separate codes. Endorsement code 900 identifies the endorsement sent to the contact. Source code 910 identifies the source device that sent the endorsement. Contact code 920 identifies the contact that received the message. The endorsement manager software residing on the source device creates a unique identifier 930 for each endorsement sent and includes the unique identifier 930 in the link embedded in the endorsement. The unique identifier 930 is created by combining several separate codes together in any one of many encryption routines (known in the art as "hashing") to form a code that is unique for each endorsement sent by a subscriber. Source code 910 and contact code 920 may be created based on device serial number, phone number or other numbers unique to the device. Other codes, including the date code 922 and geographic location 924 of the source device may be combined as well to create unique identifier 930. Endorsement code 900 is included in the endorsement when it is downloaded by the subscriber.

In other embodiments, the identity of the contacts, the duration of the message and communication, the scheduling of advertisements to view and the length of time that the contacts browser is focused on the advertisement are recorded. Additional information collected can include links navigated to, before and after, viewing the advertisement can be recorded. In certain cases, identification of contacts recognized by the recipient can be logged. Identification of music files, licenses and picture files may be collected. Call log information may be collected. Data reflecting prior approval as a qualified subscriber, and use of the system by the recipient may also be collected. Data reflecting network information such as packet count and packet size may be collected. Data reflecting location information via a GPS transponder may be collected. The analysis may include grouping data with other similar data from other subscribers to develop product delivery trends, demographic profiles and transaction history information. Analysis of customer location and dwell times at various websites and "brick and mortar" stores may be analyzed at step 751.

Continuing with FIG. 7c, at step 726, a report, showing an analysis of the progress and status of the endorsement program, is sent to the advertiser by intermediary 640. At step 728, the advertiser may verify the report or modify the endorsement program. At step 729, advertiser 660 may request additional information and analysis from the intermediary. In-turn, the intermediary supplies additional reports via step 726. At step 730, the appropriate endorsement program is implemented. This may be a shipment of a product or delivery of a service to a subscriber 600, or allocation of other goods or services to subscriber 600. Of course, other means of implementing the endorsement program, such as electronic delivery of digital goods (e.g., .mp3 coded music files) or services may also be employed.

Returning to FIG. 6, in an additional alternative embodiment, a subscriber representative 630 may assume a proxy arrangement for subscribers 600, 610 and 620. In a proxy arrangement subscriber representative 630 acts on behalf of a group of subscribers that share similar demographic features. A proxy arrangement can be organized to facilitate use of the system by a group of subscribers by pooling and offering endorsement programs through all the subscribers source devices 602, 612, 622 that are included in the proxy. In this instance, an endorsement program may be changed to also include an endorsement by the subscriber representative.

In another embodiment, an advertiser offers better goods or services than those of another advertiser in exchange for preferred treatment. This preferred treatment includes more frequent insertion of one advertiser's advertisements or endorsement programs over any others, particular days or time of day for sending advertisements, particular geographic locations, and advertisements sent to particular contacts of the subscriber. For example, an advertiser may endorse subscribers who are fans of a particular sport immediately before, during or after a particular game. Also, an advertiser may endorse a subscriber who calls a contact that has responded to a message in the past. A contact who has responded in the past may be identified by a phone number, an IP address or similar information that is transferred when the contact responds to the endorsement.

Figure 8:
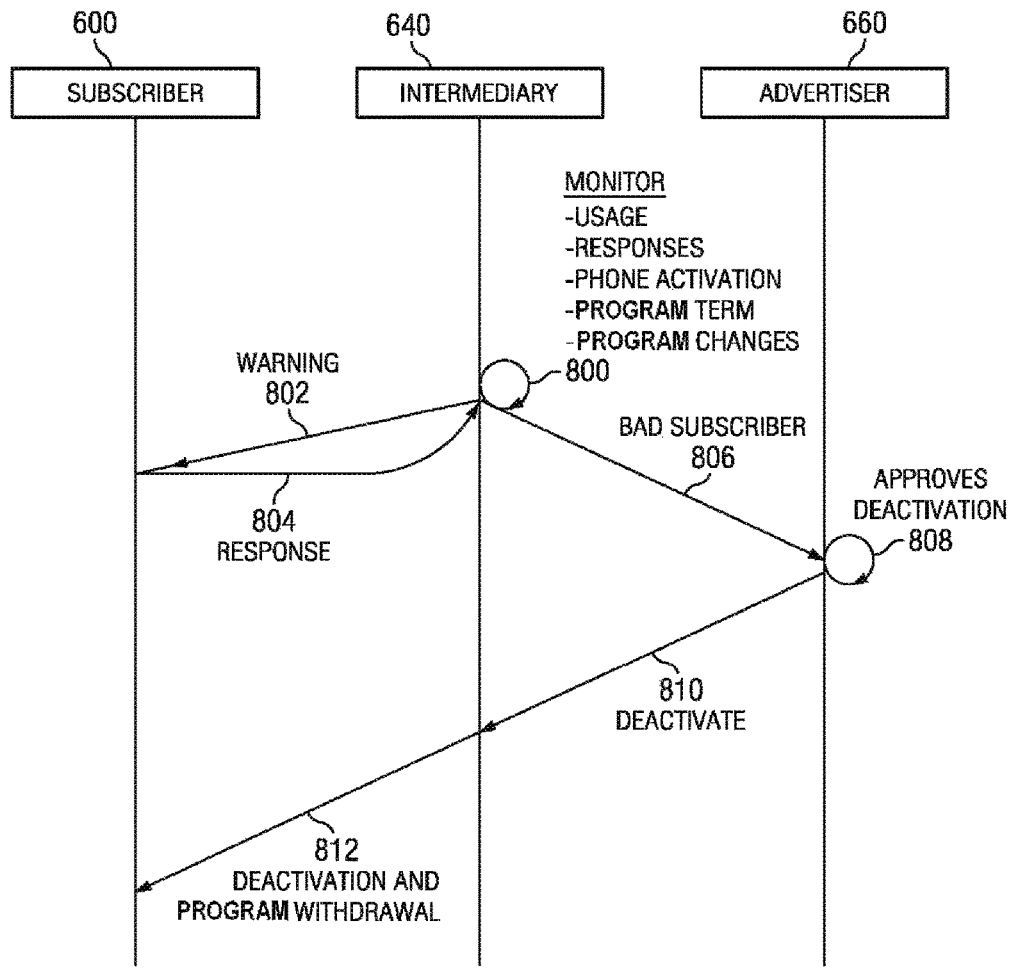
FIG. 8 describes interactions between the subscriber, intermediary and advertiser nodes during the subscriber de-enrollment process.

FIG. 8 describes the de-enrollment process. At step 800, intermediary 640 monitors various aspects of subscriber 600 and source device 602. Among other things, intermediary 640 may monitor source device usage, device activation, responses from contacts and expiration of or changes to the current endorsement program. At step 802, intermediary 640 warns subscriber 600 of a status change that could result in a change to the endorsement program. Subscriber 600 responds to the warning at step 804. At step 806, the intermediary notifies advertiser 660 that subscriber 600 may no longer qualify for the current endorsement program.

At step 808, advertiser 660 determines if subscriber 600 is still a qualified subscriber. Alternatively, advertiser 660 may decide to allow subscriber 600 time to cure any deficiencies in qualified subscriber status while allowing subscriber 600 to remain on the endorsement program.

At step 810, advertiser 660 sends a deactivation notice to intermediary 640. At step 812, intermediary 640 then deactivates subscriber 600 and removes source device 602 from the endorsement program.

An embodiment of the present disclosure can take the form of an entirely hardware embodiment, an entirely software embodiment, or an embodiment containing both hardware and software elements. For example, one of the previously described embodiments may be implemented in software, which includes but is not limited to firmware, resident software, microcode, etc. In addition, various steps of the above processes may be performed in another order, split into additional steps, or combined into a single step. Steps may also be removed and or added to any of the above processes.

Furthermore, the present disclosure can take the form of a computer program product accessible from a tangible computer-usable or computer-readable medium providing program code for use by or in connection with a computer or any instruction execution system. For the purposes of this description, a tangible computer-usable or computer-readable medium can be any apparatus that can contain, store, communicate, propagate, or transport the endorsement program for use by or in connection with the instruction execution system, apparatus, or device. The medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital video disc (DVD).

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

The invention claimed is:

1. A method for targeted distribution of promotional information relating to one or more product or service promotions by one or more advertisers, the distribution being first to one or more source communication devices associated respectively with one or more qualified subscribers and thereafter from the one or more source communication devices to one or more destination communication devices associated respectively with one or more recipients having relationships with a qualified subscriber from whom the information was received, wherein an intermediary between the one or more advertisers and the one or more qualified subscribers comprises a server, the method comprising the steps of:

a. obtaining, at the intermediary, from at least one advertiser, a first profile including demographic data desired by the advertiser;

b. obtaining, at the intermediary, from at least one source communication device, a second profile including demographic data relating to a subscriber;

c. deriving, at the intermediary, a match condition between the first profile and the second profile, thereby qualifying the subscriber for the receipt of the promotional information and determining a matched advertiser;

d. upon qualifying the subscriber, communicating from the intermediary to a source communication device associated with the qualified subscriber, first product or service information relating to one or more promotions by the matched advertiser;

e. after communicating the first product or service information to the source communication device associated with the qualified subscriber, receiving, at the intermediary, an express selection by the qualified subscriber of at least one selected promotion of the one or more promotions;

f. subsequent to the step of receiving the express selection, transmitting from the intermediary to the source communication device, second information for creating a content communication, related to the at least one selected promotion, that can be sent from the source communication device to the one or more destination communication devices respectively associated with one or more recipients having relationships with the qualified subscriber, the second information including at least an executable link for providing the one or more recipients access to third information relating to at least one of the group of the matched advertiser and the at least one selected promotion; and, g. hashing an endorsement code, a source code, and a contact code to form a unique identifier that is included in the content communication sent to the destination device.

2. The method of claim 1 further comprising the step of sending the content communication from the source communication device to the one or more destination communication devices.

3. The method of claim 1 further comprising the step of providing an endorsement program in the form of one of the group of a product selection, a service selection, a delivery selection, a storage selection, a comparison selection and an evaluation selection.

4. The method of claim 1 further comprising the step of receiving, at the intermediary, confirmation that a recipient has executed the executable link.

5. A targeted advertising system for providing access to advertising content from an advertiser to a source communication device, associated with a subscriber, and providing the access to the advertising content from the source communication device to a destination communication device, associated with a recipient, comprising:

a. a server, programmed to act as an intermediary and to store and execute instructions that cause the targeted advertising system to perform operations comprising:

b. receiving at the server, a first set of information that describes one or more attributes related to the one or more subscribers;

c. receiving at the server, a second set of information that describes one or more attributes for targeting the advertising content to the subscriber;

d. establishing an agreement between the subscriber and the advertiser to access the advertising content;

e. after establishing the agreement, sending, from the server to the subscriber communication device, a third set of information, relating to the set of advertising content, selected on the basis of a match between the first set of information and the second set of information, the third set of information including a component for inclusion in a communication to the recipient communication device;

f. providing the advertising content to the recipient communication device;

g. hashing an endorsement code, a source code, and a contact code to form a unique identifier that is included in the content communication sent to the destination device;

wherein the source communication device hashes the endorsement code, the source code, and the contact code to form the unique identifier;

wherein the endorsement code identifies the content communication sent to the destination communication device;

wherein the source code identifies the source communication device and is based on a first number unique to the source communication device, including one or more of a first serial number and a first phone number; and, wherein the contact code identifies a recipient of the one or more recipients that is associated with the destination communication device and the contact code is based on a second number unique to the destination communication device, including one or more of the first serial number and the first phone number.

6. The targeted advertising system of claim 5 wherein the operations further comprise:

receiving, at the server, an indication that the recipient communication device has interacted with the communication in a defined manner; and, providing the advertising content to the recipient communication device in response to receiving the indication.

7. The targeted advertising system of claim 5 wherein the operations further comprise:

allocating one of the group of a product and a service to the subscriber in exchange for communicating the component to the recipient communication device.

8. The targeted advertising system of claim 7 wherein the step of allocating is conditioned on the recipient communication device interacting with the component in a defined manner.

9. The targeted advertising system of claim 8 wherein the step of allocating includes delivery of a product related to the set of advertising content.

10. The targeted advertising system of claim 9 wherein a product delivery schedule is managed by the server.

11. The targeted advertising system of claim 5 wherein the first set of information includes a geographic location.

12. The targeted advertising system of claim 5 wherein the component includes a link to the server.

13. The targeted advertising system of claim 5 wherein the component includes a link to the advertiser.

14. The targeted advertising system of claim 5 wherein the communication includes a fourth set of information related to the advertising content and the component is a link to a fifth set of information related to the advertising content.

15. The targeted advertising system of claim 5 wherein the operations further comprise:
   receiving, at the server, a selection, related to the advertising content, from the subscriber communication device; and,
   in response to the selection, providing the third set of information to the subscriber communication device.

16. The targeted advertising system of claim 15 wherein the operations further comprise:
   receiving, at the server, from the subscriber communication device, an identification of the recipient communication device that a subscriber has identified for sharing the third set of information; and,
   in response to receipt of the third set of information, making the third set of information available to the recipient communication device.

17. The method of claim 1:
   wherein the source communication device hashes the endorsement code, the source code, and the contact code to form the unique identifier.

18. The method of claim 17:
   wherein the endorsement code identifies the content communication sent to the destination communication device;
   wherein the source code identifies the source communication device and is based on a first number unique to the source communication device, including one or more of a first serial number and a first phone number; and,
   wherein the contact code identifies a recipient of the one or more recipients that is associated with the destination communication device and the contact code is based on a second number unique to the destination communication device, including one or more of the first serial number and the first phone number.

* * * * *